United States Patent
Orita

Patent Number: 5,600,657
Date of Patent: Feb. 4, 1997

[54] TRANSMISSION PATH FAULT DETECTING METHOD AND SYSTEM

[75] Inventor: Kenichiro Orita, Hadano, Japan

[73] Assignee: Hitachi, Ltd., Tokyo, Japan

[21] Appl. No.: 462,994

[22] Filed: Jun. 5, 1995

Related U.S. Application Data

[63] Continuation of Ser. No. 891,784, Jun. 1, 1992, abandoned.

[30] Foreign Application Priority Data

Jun. 7, 1991 [JP] Japan ................. 3-162536

[51] Int. Cl.$^6$ .................. H04B 3/46; H04B 17/00
[52] U.S. Cl. ........................ 371/20.6; 371/68.2
[58] Field of Search .................. 371/20.6, 8.2, 371/8.3, 11.2, 20.4, 20.5, 57.1, 47.1, 53, 55, 65, 67.1, 68.2; 370/85.5, 16

[56] References Cited

U.S. PATENT DOCUMENTS

| | | | |
|---|---|---|---|
| 4,509,117 | 4/1985 | Korowitz | 364/16 |
| 4,566,097 | 1/1986 | Bederman | 370/89 |
| 4,710,915 | 12/1987 | Kitahara | 370/16 |
| 5,150,356 | 9/1992 | Tsutsui | 370/16.1 |

FOREIGN PATENT DOCUMENTS

2435299C2  5/1985  Germany.

*Primary Examiner*—Hoa T. Nguyen
*Attorney, Agent, or Firm*—Kenyon & Kenyon

[57] ABSTRACT

A transmission line fault detecting method and system use fault detectors capable of sending and receiving a fault locating frame of an arbitrary length for reliably detecting the location in the transmission line where the fault occurred. A number of such fault detectors are incorporated in a ring transmission system, wherein each detector sends and receives a fault locating frame including a first frame bounded by a starting delimiter and an ending delimiter, and a second frame following the first frame and containing other data bounded by an ending delimiter. The fault locating frame has a large frame length, preferably on the order of 4000 bytes. The first frame is formatted according to the communication protocol inherent to the transmission system. The present invention advantageously enables even a fault of less significance to be detected with high reliability.

19 Claims, 3 Drawing Sheets

TRANSMISSION PATH FAULT DETECTING METHOD AND SYSTEM

This application is a continuation of application No. 07/891,784, filed 1 Jun. 1992, now abandoned.

BACKGROUND OF THE INVENTION

The present invention relates generally to a ring topology transmission system, such as a token ring LAN (Local Area Network), and more particularly to a transmission line fault detecting method and system which are capable of easily and reliably identifying a location of a transmission line suffering from a fault with a high reliability.

In a typical ring topology transmission system, a transmission line fault is detected by using a fault locating frame having a format conforming to a standard stipulated in IEEE 802.5 (referred to as the "beacon MAC frame"). This fault locating frame has a length of approximately 40 bytes confined between a starting delimiter and an ending delimiter, wherein the frame length and intraframe format are specified by IEEE 802.5. Identifying the location of a transmission line fault is initiated when the system detects the disappearance of a token; i.e., when any token can no longer be received. Each of several individual fault detectors installed along the transmission line determines that a fault has occurred and sends out a fault locating frame. At least one of the fault detectors should fail to receive a fault detecting frame due to the fault. The system may thus determine that along the transmission line. The fault exists upstream of that detector.

Transmission line fault detecting systems such described above are disclosed in, for example, JP-A-61-187441 and JP-A-1-221954.

Known transmission line fault detecting systems provide inadequate fault detection due to their use of a fault locating frame having a predetermined length (about 40 bytes) and a predetermined format (according to IEEE 802.5). Such systems are generally incapable of detecting significant faults which allow data on the order of 40 bytes or less to be transmitted normally but which cause transmission failure on longer data strings.

Such known fault detection systems are constrained by the design of stations connected to the transmission line. In any station connected to the transmission line, only a fault locating frame according to IEEE 802.5 is regarded as an authentic fault locating frame. All frames which depart from that standard are rejected. Consequently, the fault detecting system is necessarily forced to use the fault locating frame standardized by IEEE 802.5 to ensure compatibility with the stations connected to the transmission line. In other words, the fault detecting system must use a fixed-length, standardized fault locating frame to determine the location in a transmission line at which a fault is taking place.

This constraint is problematic, since the ability to detect certain transmission line faults depends on the length of the fault locating frame used. A fault may occur in such a way that a frame of a relatively short length passes regularly through the faulty location, while a frame of a greater length is prevented from passing through. Such a fault may be undetectable with a 40-byte fault locating frame.

Thus, when the fault locating frame of the length standardized by IEEE 802.5 is sent out upon occurrence of a fault in the transmission line, an FCS (Frame Check Sequence) error may be detected with a certain probability. However, the fault may be of a type that the standard-length frame is regularly transmitted through the transmission line, thus preventing the fault detection system from locating the fault with a high degree of reliability.

SUMMARY OF THE INVENTION

The present invention provides a transmission line fault detecting method and system which overcome the limitations of prior art techniques involving a fixed-length, standardized fault locating frame. A fault detection system according to the present invention is capable of detecting a faulty location of a transmission line by allowing a fault locating frame of an arbitrary frame length to be sent and received while still abiding by the requirements stipulated in IEEE 802.5

In an exemplary embodiment a fault detecting system includes a number of fault detectors having a facility for sending and receiving a variable-length fault locating frame. Such a frame consists of a frame marked by a starting delimiter and an ending delimiter, with arbitrary-length data added in succession to the frame. Such a variable-length fault locating frame enables a fault detecting system to identify the location of a wider variety of line than is possible using a fixed-length, standardized frame.

In an alternate embodiment of the invention, the fault locating frame may include a first frame marked by a starting delimiter, and an ending delimiter, and a second frame following the first frame having additional data and a second ending delimiter disposed at the tail.

In yet another embodiment, the first and second frames may include address information identifying the fault detector which sent the fault locating frame. Further, the second frame may be formatted such that a frame check sequence (FCS) is added to a bit range starting at an arbitrary bit of the second frame and ending at a bit positioned before the ending delimiter.

Furthermore, each of the transmission line fault detectors may preferably include a facility capable of selectively and receiving a fault locating frame consisting of either one or two frames.

DESCRIPTION OF THE PREFERRED EMBODIMENTS

Figure 3:
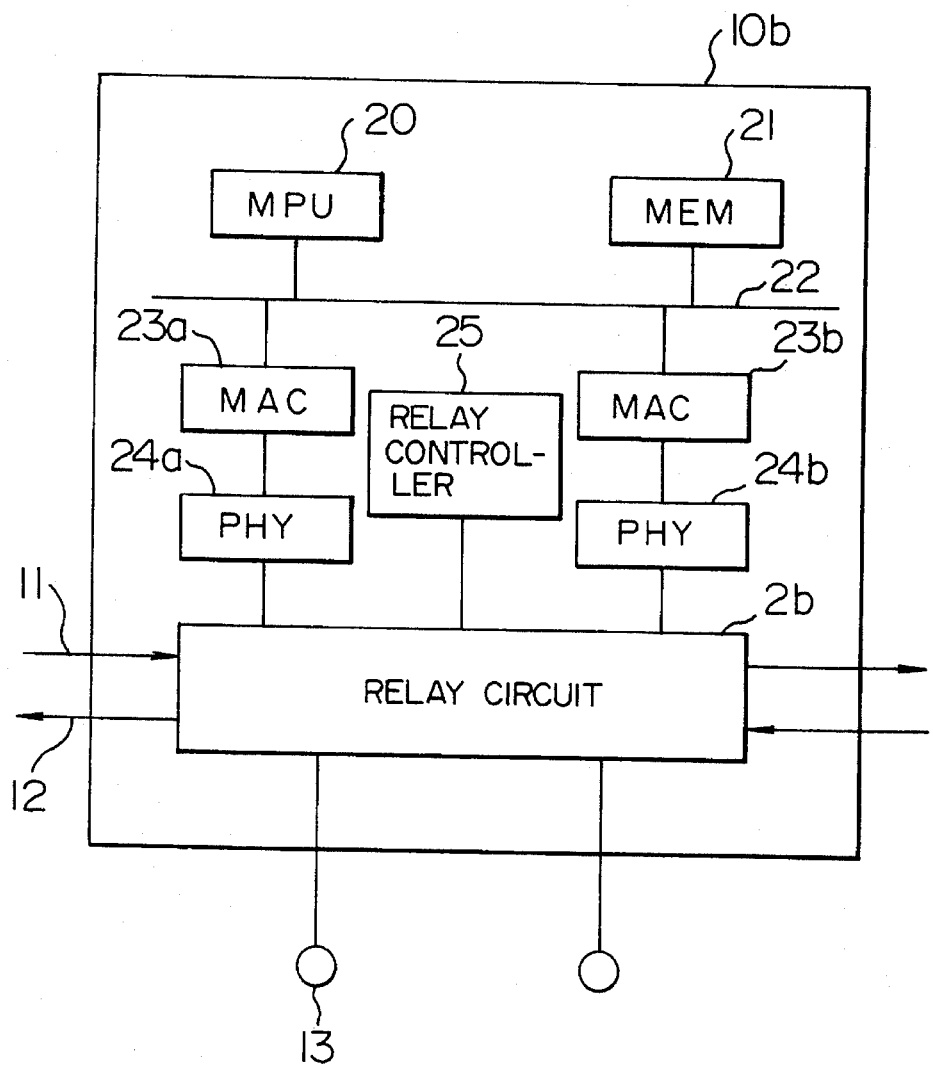
FIG. 3 is a block diagram showing a structure of a fault detector according to an embodiment of the invention.

The transmission line fault detection system add method to the present invention are described below in light of preferred or exemplary embodiments and with reference to the drawings. In FIG. 3, reference numerals 20 denotes a microprocessor (MPU), 21 denotes a memory (MEM), 23a denotes a MAC-layer controller for the first ring, 23b denotes a MAC-layer controller for the second ring, 24a denotes a physical-layer controller for the first ring, 24b denotes a physical-layer controller for the second ring, 25 denotes a relay controller and a numeral 26 denotes a relay circuit.

Figure 1:
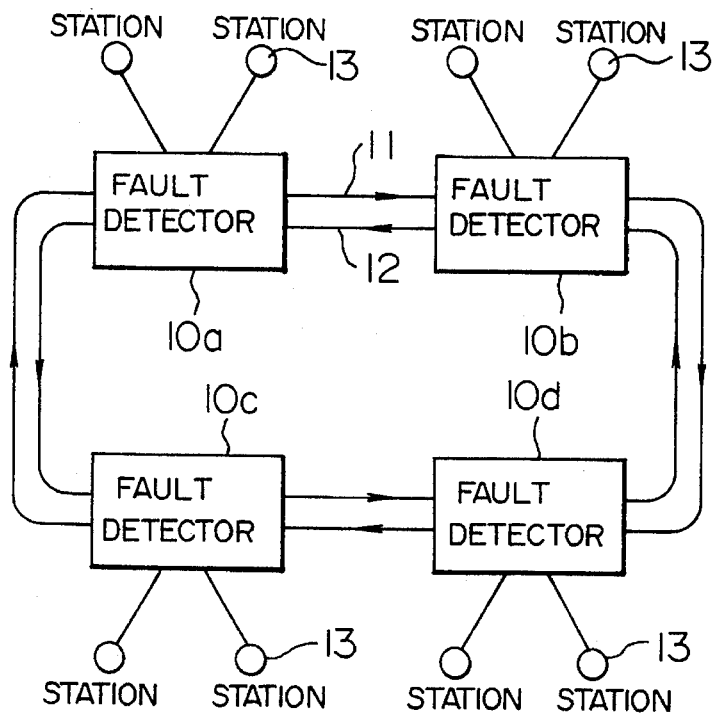
FIG. 1 is a block diagram schematically showing a structure of a transmission system according to an embodiment of the present invention which is applied to a token ring LAN.
Figure 2:
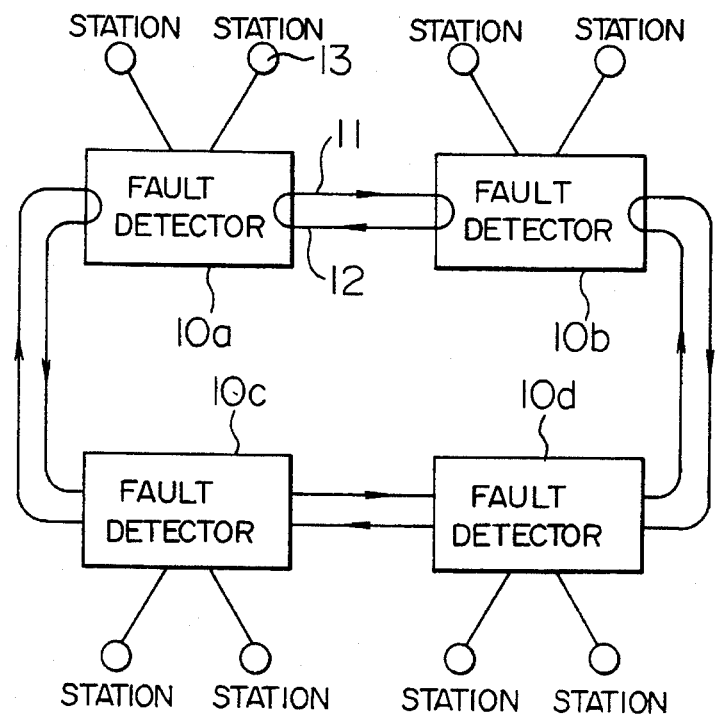
FIG. 2 is a diagram for illustrating a ring folding which is effectuated upon occurrence of a fault on a transmission line section between two successive fault detectors.

Referring to FIG. 1, a transmission system of a type to which the present invention may be applied includes a plurality of the fault detectors 10a–10d which are each adapted to accommodate a plurality of stations 13. The fault detectors 10a–10d are interconnected by way of a first ring 11 and a second ring 12 in a ring topology configuration, wherein communications among the stations 13 are normally controlled through the first ring 11.

Figure 4:
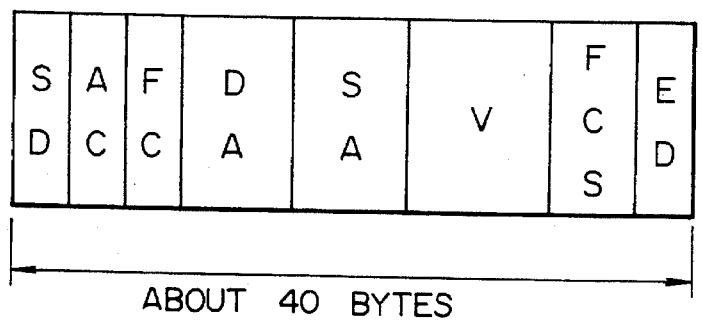
FIG. 4 is a view for illustrating a format of a fault locating frame according to IEEE standard 802.5.
Figure 5:
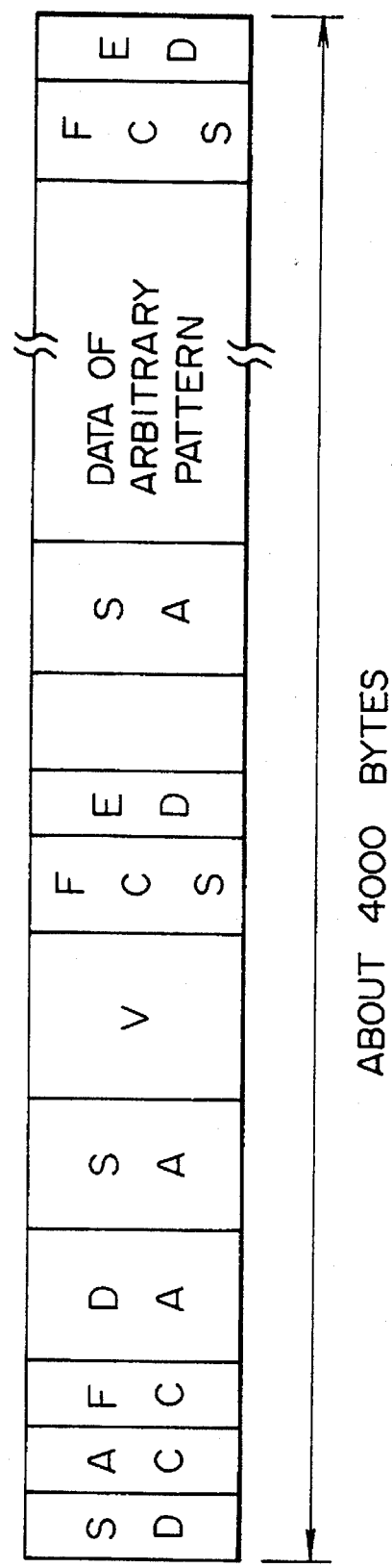
FIG. 5 is a view for illustrating a format of a fault frame transferred among fault locating detectors according to an embodiment of the invention.

In one embodiment of the present invention, a fault detector is designed to transmit and receive a fault locating frame formatted as illustrated in FIG. 5. Such a fault locating frame includes a leading or first frame formatted according to the standard of IEEE 802.5, shown in FIG. 4. Thus, the first frame includes a starting delimiter SD and an ending delimiter ED. The first frame is followed by a second frame having an arbitrary frame length and an arbitrary data pattern. Unlike the first frame, the second frame has no starting delimiter and contains an FCS (Frame Check Sequence) field followed by an end limiter ED. The second frame may also include an address SA of the fault detector which transmitted the frame.

The fault locating frame according to the embodiment shown in FIG. 5 may have a frame length of approximately 4000 bytes, so that a fault of less significance which might be undetectable with a fault locating frame of a shorter length (as dictated by IEEE 802.5) may be detected with reliability.

Parenthetically, the meanings of abbreviations used in FIGS. 4 and 5 are mentioned below (for further particulars, reference may be made to IEEE 802.5).

SD ... starting delimiter
AC ... access control
FC ... frame control
DA ... destination address
SA ... source address
V ... vector (including information concerning type of the fault locating frame, etc.)
FCS ... frame check sequence
ED ... ending delimiter FIG. 3 shows a circuit configuration for a fault detector 10b of an embodiment of the present invention. The fault detector 10b includes a microprocessor (MPU) for controlling the whole apparatus, a memory (MEM) 21, a common bus 22, MAC-layer controllers (MAC) 23a and 23b provided in association with the first and second rings, respectively (as shown in FIG. 1), physical layer controllers (PHY) 24a and 24b for the first and second rings, respectively, a relay controller 25 and a relay circuit 26 for connecting the first and second rings to each other upon occurrence of a fault.

To illustrate the operation of a fault detecting system according to the present invention, assume that in the transmission system described above, a relatively less-significant fault occurs place in the first ring 11 between the fault detectors 10a and 10b. A "less-significant fault", is one which reduces frame transmissivity, in contrast to a serious fault such as a breakage of a less-significant transmission line or the like.

Occurrence of the fault may be determined by detecting disappearance of the tokens by the MAC layer controller 23a for the first ring constituting a part of the fault detector 10b. In response to the detection of the fault, the physical layer controller 24a for the first ring sends out a fault locating frame formatted as shown in FIG. 5. Occurrence of the fault, as indicated by the disappearance of tokens, will be detected substantially simultaneously by other fault detectors 10a, 10c and 10d, resulting in several fault locating frames being sent out substantially simultaneously. Thus, each of the fault detectors receives an incoming fault locating frame sent from a fault detector disposed immediately upstream from it, while sending out its own fault locating frame to the fault detector immediately downstream. Upon reception of the fault locating frame sent from the upstream side, each of the fault detractors confirms that the frame received is a fault locating frame and checks whether the frame was received correctly.

An advantage of the present invention is that detection of the fault locating frame of FIG. 5 can be performed without altering the communication protocol generally used in a ring topology transmission systems. This compatibility is achieved because the first frame of the two-frame fault locating frame conforms to the standard of IEEE 802.5, thereby ensuring the fault detectors will not automatically reject the frame. The determination of whether the fault locating frame was received correctly can be performed with the FCS of the first frame together with the FCS of the second frame. The FCS check of the second frame is performed on the data starting from an arbitrary bit position in that frame. Further, by comparing the source address contained in the first frame with the source address contained in the second frame, the fault detector can confirm that both frames of the fault locating frame originate in the same fault detector, thereby enhancing the reliability of the fault locating operation.

When each of the fault detectors in the ring has determined that the fault locating frame coming from the upstream side has been correctly received, the fault detector stops sending its own fault locating frame. Instead, the fault detector enters a frame repeat mode in which the fault locating frame from the upstream side is sent to the downstream fault detector.

Since this illustration assumed that a fault occurred only in the first ring between the fault detectors 10a and 10b, the fault detector 10b can not receive correctly the fault locating frame coming from the upstream side and thus continues to send its own fault locating frame. On the other hand, the other fault detector 10a, 10c and 10d are changed over to the frame repeat mode. As the ultimate result, only the fault detector 10b continues to send out its fault locating frame, thus a fault is occurring upstream of that apparatus.

The fault locating frame used for fault location ideally an extremely great length, on the order of 4000 bytes. Accordingly, even when the fault occurring between the fault detectors 10a and 10b is of such a limited extent that a frame on the order of 40 bytes long can correctly pass through the faulty location, a fault locating frame of 4000 bytes in length can not successfully pass through the location suffering from the fault. Thus, even less-significant faults or abnormalities can be reliably detected through the FCS check performed by the fault detector 10b.

When the fault detector 10b of FIG. 3 determines that a fault exists on the transmission line upstream from it, the fault detector 10b notifies the upstream fault detector 10a of the fault through the MAC-layer controller 23b and the physical layer controller 24b for the second ring 12. At the same time, the fault detector 10b issues a ring folding command through the relay controller 25 to the relay circuit 26. Similarly, the fault detector 10a responds to reception of the fault notification from the fault detector 10b by executing a ring folding command.

The foregoing activity creates a transmission system which bypasses the fault between the fault detectors 10a and 10b (this bypassing transmission path is usually referred to as the ring-back), thereby disconnecting the faulty location to allow communications among the various stations to continue.

In the foregoing description of the operation of the fault detectors according to the present invention, it has been assumed that a relatively less-significant fault lowered frame transmissivity in the first ring between the fault detectors 10a and 10b. The method of the present invention, however, can also be carried out in a manner whereby more serious faults are quickly identified. Thus, an alternate embodiment of a method according to the present invention involves first using a conventional fault locating frame of the format shown in FIG. 4 to search for a fault. Then, if no fault is detected the longer fault locating frame shown in FIG. 5 is used. With this approach, a relatively serious fault can be detected rapidly owing to the shorter length of the fault locating frame used initially.

As will now be appreciated from the foregoing, by virtue of a use of the fault locating frame consisting of a first frame bounded by a starting delimiter and an ending delimiter in conformance with the standard of IEEE 802.5 and a second frame following the first frame containing other data in addition to delimiting, a station connected to a fault detector will recognize the fault locating frame as one which conforms to the standard of IEEE 802.5. In this way, according to the illustrated embodiment of the invention, fault localization can be realized while still abiding by the standard of IEEE 802.5.

Furthermore, according to the teachings of the invention incarnated in the illustrated embodiment the paired first and second frames can be handled as a single fault locating frame, making it possible to perform the search for a fault using a much longer frame than was possible with prior art systems. By virtue of this feature, the fault detecting capability is unexpectedly enhanced when compared to the conventional fault locating technique using a fault locating frame of about 40 bytes in length.

While the foregoing description of the present invention focused on a token ring LAN, those skilled in the art will recognize that the invention is equally applicable to other types of ring topology transmission systems. Moreover, the first frame can be realized as a fault locating frame stipulated by the particular protocol of the system to which the invention is applied, and is not limited strictly to the standard of IEEE 802.5.

I claim:

1. A transmission system comprising:

a transmission line;

a plurality of fault detectors installed along said transmission line and mutually connected to one another in a ring-like configuration; and a plurality of stations, each of which is connected to one of said plurality of fault detectors and communicates with another one of said plurality of stations along said transmission line;

wherein each of said fault detectors includes:

a token detector detecting a fault as indicated by a disappearance of a token passed by one of said plurality of fault detectors or said plurality of stations;

a transmitter responsive to said token detector and sending a fault locating frame including a first portion and a second portion, said first portion bounded by a starting delimiter and a first ending delimiter and including information identifying said fault locating frame, and said second portion appended to said first portion and comprising a data string of arbitrary length followed by a second ending delimiter indicating the end of said second portion;

a receiver receiving a fault locating frame sent by a transmitter of another of said plurality of fault detectors, said receiver including means for determining whether said fault locating frame is successfully received; and a fault locator determining that the fault detected by said token detector exists between said fault detector and an upstream fault detector when said fault detector fails to successfully receive a fault locating frame from said upstream fault detector.

2. The transmission system of claim 1, wherein each of said first and second portions of said fault locating frame includes address information identifying said fault detector sending said fault locating frame.

3. The transmission system of claim 2, wherein said second portion includes a frame check sequence added to bits over a range starting from an arbitrary bit position of said second portion and ending at a bit position prior to said second ending delimiter.

4. The transmission system of claim 1 wherein said first portion comprises an IEEE standard fault locating frame.

5. The transmission system of claim 1 wherein said fault locator includes means for determining the fault detected by said token detector is a relatively less significant fault when said fault detector successfully receives said first portion of a fault locating frame sent by an upstream fault detector but fails to successfully receive said second portion of said fault locating frame.

6. A transmission system comprising:

a transmission line;

a plurality of fault detectors installed along said transmission line and mutually connected to one another in a ring-like configuration; and a plurality of stations, each of which is connected to one of said plurality of fault detectors and communicates with another one of said plurality of stations along said transmission line;

wherein each of said fault detectors comprises:

a token detector detecting a fault as indicated by a disappearance of a token passed by one of said plurality of fault detectors or said plurality of stations;

a transmitter responsive to said token detector selectively sending a fault locating frame of either a first or second type, with said first type of fault locating frame bounded by a starting delimiter and a first ending delimiter and including information identifying said fault locating frame, and said second type of fault locating frame having a first portion configured like said first type of fault locating frame, and a second portion appended to said first portion comprising a data string of arbitrary length followed by a second ending delimiter indicating the end of said second portion;

a receiver receiving a fault locating frame sent by a transmitter of another of said plurality of fault detectors, said receiver including means for determining whether said fault locating frame is successfully received; and a fault locator determining that said fault detected by said token detector exists between said fault detector and an upstream fault detector when said fault detector fails to successfully receive a fault locating frame from said upstream fault detector.

7. The transmission system of claim 6 wherein said first type of fault locating frame conforms to an IEEE standard.

8. A method for locating a fault in a transmission system including a transmission line, a plurality of fault detectors installed along the transmission line and mutually connected to one another in a ring-like configuration, and a plurality of stations, wherein each of the plurality of stations is connected to one of said plurality of fault detectors and communicates with another one of said plurality of stations along said transmission line, said method for locating a fault comprising the steps of:

detecting a fault as indicated by a disappearance of a token passed by one of said plurality of fault detectors or said plurality of stations;

transmitting from each of said plurality of fault detectors a fault locating frame comprising a first portion bounded by a starting delimiter and a first ending delimiter and including information identifying said fault locating frame, and a second portion appended to said first portion comprising a data string of arbitrary length followed by a second ending delimiter indicating the end of said second portion;

receiving in each of said plurality of fault detectors a fault locating frame transmitted by an upstream fault detector;

determining in each of said plurality of fault detectors whether said fault locating frame is successfully received; and determining in each of said plurality of fault detectors that the fault detected by said fault detector exists between said fault detector and an upstream fault detector when said fault detector fails to successfully receive said fault locating frame transmitted by said upstream fault detector.

9. The method of claim 8, wherein each of said first and second portions of said fault locating frame includes address information identifying a fault detector from which said fault locating frame originated.

10. The method of claim 9, wherein said second portion includes a frame check sequence added to bits over a range starting from an arbitrary bit position of said second portion and ending at a bit position prior to said second ending delimiter.

11. The method of claim 8 wherein said first portion comprises an IEEE Standard fault locating frame.

12. A method for locating a fault in a transmission system including a transmission line, a plurality of fault detectors installed along the transmission line, and a plurality of stations, wherein each of said plurality of stations is connected to one of said plurality of fault detectors and communicates with another of said plurality of stations along said transmission line, and said plurality of fault detectors are mutually connected to one another in a ring-like configuration, said method for locating a fault comprising the steps of:

detecting a fault as indicated by a disappearance of a token passed by one of said plurality of fault detectors or said plurality of stations;

selectively transmitting from each of said plurality of fault detectors one of a first or second type of fault locating frame, with said first type of fault locating frame bounded by a starting delimiter and a first ending delimiter and including information identifying said fault locating frame, and said second type of fault locating frame including a first portion configured like said first type of fault locating frame, and a second portion appended to said first portion comprising a data string of arbitrary length followed by a second ending delimiter indicating the end of said second portion;

receiving in each of said plurality of fault detectors a fault locating frame transmitted by an upstream fault detector;

determining in each of said plurality of fault detectors whether said fault locating frame is successfully received; and determining in each of said plurality of fault detectors that the fault detected by said fault detector exists between said fault detector and an upstream fault detector where said fault detector fails to successfully receive a fault locating frame transmitted by said upstream fault detector.

13. The method of claim 12 wherein said first type of fault locating frame conforms to an IEEE standard.

14. A fault detector for locating a fault in a transmission system including a transmission line, a plurality of such fault detectors installed along said transmission line and mutually connected to one another in a ring-like configuration, and a plurality of stations, with each of said plurality of stations connected to one of said plurality of fault detectors and communicating with another of said plurality of stations along said transmission line, said fault detector comprising:

a token detector detecting a fault as indicated by a disappearance of a token passed by one of said plurality of fault detectors or said plurality of stations;

a transmitter responsive to said token detector sending a fault locating frame including a first portion and a second portion, said first portion bounded by a starting delimiter and a first ending delimiter and including information identifying said fault locating frame, and said second portion following said first portion comprising a data string of arbitrary length followed by a second ending delimiter indicating the end of said second portion;

a receiver receiving a fault locating frame sent by transmitter of another of said plurality of fault detectors, said receiver including means for determining whether said fault locating frame is successfully received; and a fault locator determining that the fault detected by said token detector exists between said fault detector and an upstream fault detector when said fault detector fails to successfully receive a fault locating frame sent by said upstream fault detector.

15. The fault detector of claim 14, wherein each of said first and second portions of said fault locating frame includes address information identifying a fault detector from which said fault locating frame was sent.

16. The fault detector of claim 14, wherein said second portion includes a frame check sequence added to bits over a range starting from an arbitrary bit position of said second portion and ending at a bit position prior to said second ending delimiter.

17. The transmission system of claim 14 wherein said fault locator includes means for determining the fault detected by said token detector is a relatively less significant fault when said fault detector successfully receives said first portion of a fault locating frame sent by an upstream fault detector but fails to successfully receive said second portion of said fault locating frame.

18. A fault detector for locating a fault in a transmission system including a transmission line, a plurality of such fault detectors installed along said transmission line and mutually connected to one another in a ring-like configuration, and a plurality of stations, with each of said plurality of stations connected to one of said plurality of fault detectors and communicating with another one of said plurality of stations along said transmission line, said fault detector comprising:

a token detector detecting a fault as indicated by a disappearance of a token passed by one of said plurality of fault detectors or said plurality of stations;

a transmitter responsive to said token detector selectively sending a fault locating frame of either a first or second type, said first type of fault locating frame bounded by a starting delimiter and a first ending delimiter and including information identifying said fault locating frame, and said second type of fault locating frame including a first portion configured like said first type of fault locating frame, and a second portion appended to said first portion comprising a data string of arbitrary length followed by a second ending delimiter indicating the end of said second portion;

a receiver receiving a fault locating frame sent by a transmitter of another of said plurality of fault detectors, said receiver including means for determining whether said fault locating frame is successfully received; and a fault locator determining that the fault detected by said token detector exists between said fault detector and an upstream fault detector when said fault detector fails to successfully receive a fault locating frame sent by said upstream fault detector.

19. The fault detector of claim 18 wherein said first type of fault locating frame conforms to an IEEE standard.

* * * * *